Patented Aug. 26, 1941

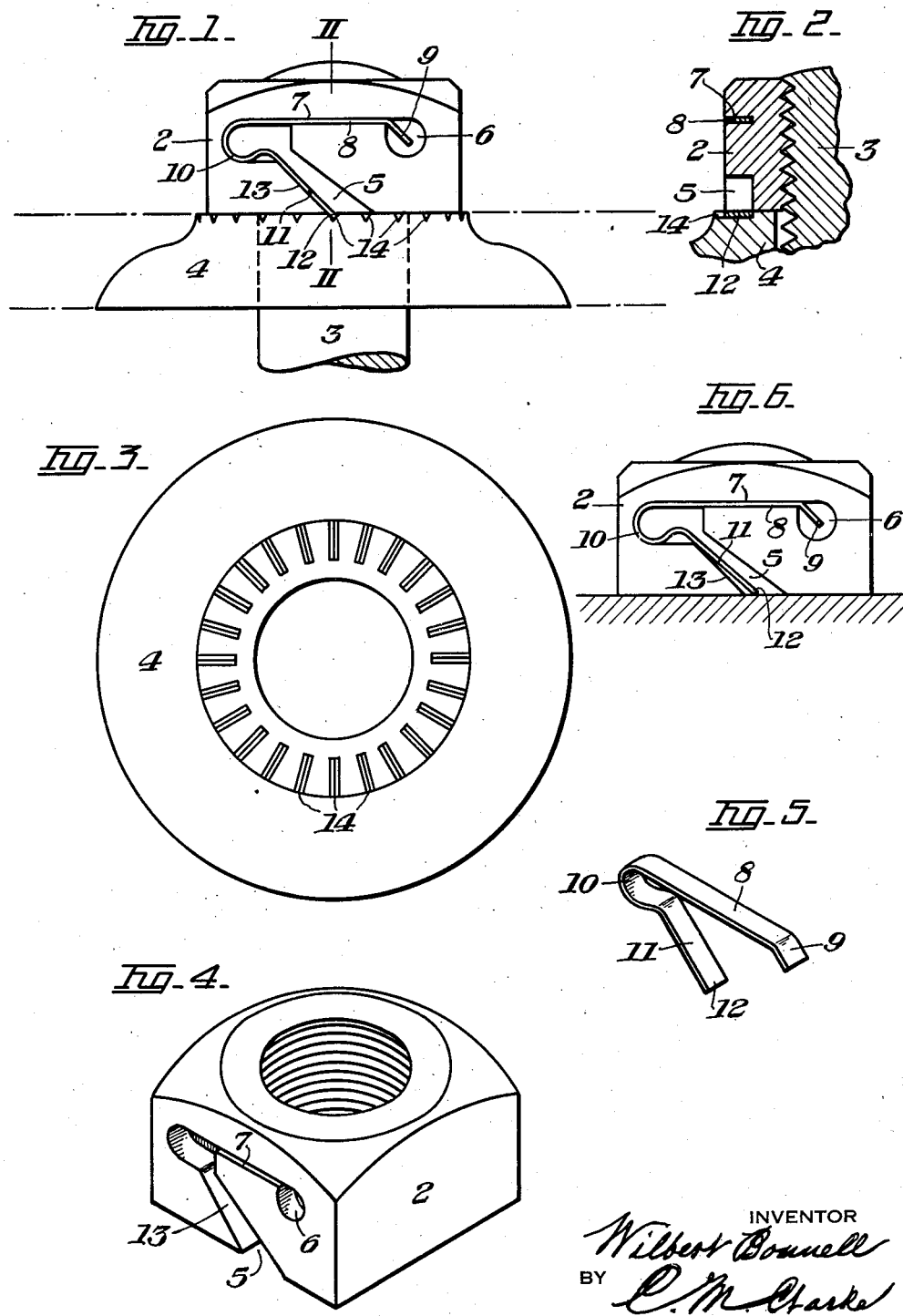
Aug. 26, 1941. W. BONNELL 2,254,027
NUT LOCK
Filed Dec. 15, 1939

2,254,027

UNITED STATES PATENT OFFICE 2,254,027

NUT LOCK

Wilbert Bonnell, Elizabeth, Pa.

Application December 15, 1939, Serial No. 309,345

3 Claims. (Cl. 151—40)

My invention is an improvement in nut locks of the ratchet type for prevention of reverse rotation of the nut. It consists of a nut of any standard form, as square or polygonal, provided in one or more of its sides with a spring detent or pawl acting as a holding device in connection with the face of a washer, fish plate or the like, as hereinafter described.

One preferred embodiment of the invention is shown in the accompanying drawing, in which:

Fig. 1 is a view in elevation of a nut provided with my improvement, and in engagement with a washer;

Fig. 2 is a part sectional view on the line II—II of Fig. 1;

Fig. 3 is a plan view of the washer;

Fig. 4 is a perspective view of the nut, illustrating the spring-receiving cavities;

Fig. 5 is a similar detail view of the holding spring, detached;

Fig. 6 is a detailed view showing the action of the spring terminal against the plane surface of a washer or fish plate.

The nut 2 may be square as shown, adapted to engage the threaded end of bolt 3 in the usual manner and preferably in connection with a washer 4, or fish plate as indicated in dotted lines Fig. 1, or other similar element, against which the nut is tightened.

The nut is provided at one or more sides with a spring-receiving recess consisting of a main open outwardly diverging clearance space 5, a smaller clearance space 6 of circular or other form, and an intervening connecting holding slot 7.

Into such slot is tightly driven or pressed the middle shank portion of a leaf spring 8. In general construction such spring is adapted to occupy the clearance spaces 5 and 6 by its extremities or terminal portions, and to be received in the connecting groove 7, by tight engagement therein.

Spring 8 is provided with the downwardly turned end 9 for location in the cavity 6 and with the looped portion 10 and the resilient holding extension 11, terminating in the biting terminal edge 12. The advantage of clearance space 5 and of the general formation shown, is in providing ample space for free spring action of the arm 11, the normal tendency of which is to expand and press outwardly against the sloping wall face 13 of the nut. Ample clearance space for looped portion 10 is provided as shown beyond the tightly holding groove 7, as shown in Figs. 1 and 6.

Terminal 12 in such position extends slightly beyond the under face of the nut and will spring backwardly when the nut is rotated for tightening, and will engage against the surface of the washer 4, whether smooth or notched. Notches 14 however may be arranged annularly of the washer face so that at short intervals the spring terminal will engage one such notch when the nut is screwed up tight, and will positively prevent reverse movement of the nut.

The tight holding of the spring 8 in the groove 7 fixedly maintains the shank portion in proper position in the receiving spaces or cavities, while opening 5 or 6 allows for insertion of a prying instrument, as a screw driver, nail, etc., if for any reason it is desired to remove the spring. If broken, or unusable for any other reason, the spring may thus be quickly removed and a new one inserted by simply driving it in to slot 7.

The proportions and shape of the spring generally conform to the openings 5, 6 and 7, so that the spring will be snugly contained within such clearance spaces and holding slot and without projection beyond the face of the nut, as in Fig. 2.

Fig. 6 shows the position of the spring when used with a smooth face washer or fish plate, etc., in which case the lower edge of terminal 12 engages the face under spring pressure, to prevent reverse motion of the nut.

The spring 8 is of suitable size and dimensions, and of properly tempered steel to maintain its efficiency under all conditions and for an indefinite period. Being tightly connected with the nut, it forms a component element therewith, avoiding the necessity of separate spring washers or other such holding devices, and will be found to be efficient, durable, cheap, and satisfactory.

In any case requiring loosening or removal of the nut, the holding terminal 12 of the spring may be temporarily disengaged by inserting the sharp end of a suitable tool between the spring and bearing face 13 of the nut, releasing the spring for nut reversal.

The improvement provides for economical and easy manufacture of both the nut and the springs, the openings 5, 6 and 7 being easily made by die-casting or by suitable pressing dies, or by boring or milling, as preferred. The springs may be made of tempered spring steel of the proper dimensions in strip form, cut to length, bent to the form shown with ample resiliency, at very low cost.

The general construction, manner of use, and advantages of my invention will be readily understood and appreciated from the foregoing description. It may be applied to nuts of any suitable size or form, and is useful in many of the various applications of bolts requiring prevention of loosening.

Having described my invention, what I claim is:

1. A locking nut as described provided on its side face with a holding slot and an inclined clearance opening and a resilient uniform thickness leaf spring tightly mounted in the slot and having a middle reversed looped portion and an outwardly pressing free portion provided with a holding terminal normally extending beyond the inner face of the nut said nut having a clearance opening beyond the slot for reception of the other end of the spring.

2. A locking nut as described provided on its side face with an inwardly extending narrow spring-holding slot terminating in a clearance opening for a looped portion of a leaf spring and an inclined opening extending from said opening to the contacting face of the nut, and a resilient uniform thickness leaf spring tightly mounted in the slot and having a middle reversed looped portion in said clearance opening and an outwardly pressing resilient free portion in said inclined opening provided with a holding terminal normally extending beyond the inner face of the nut.

3. A locking nut as described provided on its side face with an inwardly extending narrow spring-holding slot terminating at one side in a clearance opening for a looped portion of a leaf spring and at the other side in a clearance opening for the inner spring terminal, an inclined opening between confining sides extending from said first named opening to the contacting face of the nut, and a resilient leaf spring tightly mounted in the slot and having a middle reversed looped portion in said first named clearance opening and an outwardly pressing resilient free portion in said inclined opening provided with a holding terminal normally extending beyond the inner face of the nut.

WILBERT BONNELL.